US012676074B2

(12) United States Patent
Ding

(10) Patent No.: US 12,676,074 B2
(45) Date of Patent: Jul. 7, 2026

(54) METHODS AND SYSTEMS FOR PREVENTING WRONG SURFACE EVENTS

(71) Applicant: The Boeing Company, Arlington, VA (US)

(72) Inventor: Yonglian Ding, Arlington, VA (US)

(73) Assignee: The Boeing Company, Arlington, VA (US)

( * ) Notice: Subject to any disclaimer, the term of this patent is extended or adjusted under 35 U.S.C. 154(b) by 259 days.

(21) Appl. No.: 18/342,345

(22) Filed: Jun. 27, 2023

(65) Prior Publication Data

US 2025/0006064 A1 Jan. 2, 2025

(51) Int. Cl.

*G08G 5/54* (2025.01)
*G08G 5/21* (2025.01)
*G08G 5/26* (2025.01)
*G08G 5/50* (2025.01)
*G08G 5/55* (2025.01)

(52) U.S. Cl.

CPC ................ *G08G 5/54* (2025.01); *G08G 5/21* (2025.01); *G08G 5/26* (2025.01); *G08G 5/50* (2025.01); *G08G 5/55* (2025.01)

(58) Field of Classification Search

None

See application file for complete search history.

(56) References Cited

U.S. PATENT DOCUMENTS 7,898,463 B1 * 3/2011 Mueller ................ G01S 13/953 701/1
2007/0050100 A1 * 3/2007 Gustafson ............ G05D 1/0061 701/4
2014/0278037 A1 * 9/2014 Choksi ..................... G08G 5/51 701/120
2016/0260335 A1 * 9/2016 Chenna .................... G08G 5/21
2021/0133370 A1 * 5/2021 Sweet ...................... G08G 5/54

(Continued)

OTHER PUBLICATIONS

Critchlow, Austin, "Auto-Taxi and Runway Incursion Prevention System for Commercial Aircraft," Mar. 23, 2018, pp. 1-27, <acritchlow.com/physical> (Year: 2018).*

(Continued)

*Primary Examiner* — Madison R. Inserra
(74) *Attorney, Agent, or Firm* — Joseph M. Butscher; Carroll, Hoette & Butscher, LLC

(57) ABSTRACT

Example implementations relate to systems and techniques for coordinating and assigning aircraft and ground vehicles to runways to prevent wrong surface events and to minimize runway incursions. An aircraft initially receives instructions identifying a runway for use by the aircraft generated by an Air Traffic Control Tower (ATCT) and then subsequently receives a runway identification (ID) code transmitted by a sensor subsystem positioned proximate the runway, which is used by a runway-aircraft pairing management system. An onboard verification system of the aircraft then compares the runway ID code with the runway identified in the ground navigation instruction and uses an onboard transmitter to transmit a confirmation to the sensor subsystem positioned proximate the runway when the code and runway match. The aircraft then displays instructions for the aircraft to proceed with use of the runway.

20 Claims, 5 Drawing Sheets

(56) References Cited

U.S. PATENT DOCUMENTS

| | | | | |
|---|---|---|---|---|
| 2021/0241641 A1* | 8/2021 | Zheng | ...................... | G08G 5/51 |
| 2023/0153064 A1* | 5/2023 | Henry | ...................... | G08G 5/53 370/329 |

OTHER PUBLICATIONS

Wargo, Chris A. et al., "Performance of Data Link Communications in Surface Management Operations," 2011, IEEE, pp. 1-10 (Year: 2011).*

* cited by examiner

METHODS AND SYSTEMS FOR PREVENTING WRONG SURFACE EVENTS

FIELD

The present disclosure relates generally to preventing wrong surface events on airport runways, and more particularly to systems and techniques for coordinating and assigning aircraft and ground vehicles to runways and taxi surfaces to prevent wrong surface events and to minimize runway incursions.

BACKGROUND

Airport runways and taxi surfaces are crucial components of the infrastructure at an airport. In general, runways are long, straight strips of paved surfaces designed for safe aircraft takeoff and landing and are typically constructed with materials like asphalt or concrete to withstand the weight and impact of aircraft. The runways are usually aligned according to prevailing wind patterns and can vary in length and width to accommodate different types of aircraft. Taxiways connect runways to airport terminals, hangars, and maintenance areas and are often narrower than runways and marked with painted lines and signs to guide aircraft movement on the ground. As such, Air traffic control (ATC) is tasked with maintaining safe spacing between aircraft, and between aircraft and other objects (such as other vehicles) as well as providing clearances for taxiing. Runway holding positions marked on taxiways are used to communicate with pilots a need to wait for clearance before entering the runway. Together, runways and taxiways enable the orderly and efficient movement of aircraft, facilitating the safe operation of airports.

SUMMARY

In one example, a method is disclosed. The method involves receiving, at a computing system coupled to an aircraft, a ground navigation instruction that identifies a runway for use by the aircraft. The ground navigation instruction is generated by an Air Traffic Control Tower (ATCT). The method also involves receiving, at the computing system, a runway identification (ID) code transmitted by a sensor subsystem positioned proximate the runway, wherein a runway-aircraft pairing management system generates the runway ID code for transmission by the sensor subsystem based on the ground navigation instruction generated by the ATCT. The method also involves comparing, by the computing system and using an onboard verification system, the runway ID code with the runway identified in the ground navigation instruction based on receiving the runway ID code. The method further involves, based on the comparison indicating a match between the runway ID code and the runway identified in the ground navigation instruction, transmitting, by the computing system and using an onboard transmitter, a confirmation to the sensor subsystem positioned proximate the runway and displaying, by the computing system and on an onboard display interface, instructions for the aircraft to proceed with use of the runway.

In another example, a system is disclosed. The system includes a runway-aircraft pairing management system and an aircraft having a computing system. The computing system is configured to receive a ground navigation instruction that identifies a runway for use by the aircraft, where the ground navigation instruction is generated by an ATCT. The computing system is also configured to receive a runway ID code transmitted by a sensor subsystem positioned proximate the runway, where the runway-aircraft pairing management system generates the runway ID code for transmission by the sensor subsystem based on the ground navigation instruction generated by the ATCT. The computing system is further configured to compare, using an onboard verification system, the runway ID code with the runway identified in the ground navigation instruction based on receiving the runway ID code and, based on the comparison indicating a match between the runway ID code and the runway identified in the ground navigation instruction, transmit, using an onboard transmitter, a confirmation to the sensor subsystem positioned proximate the runway. The computing system is also configured to display, on an onboard display interface, instructions for the aircraft to proceed with use of the runway.

In an additional example, a non-transitory computer-readable medium is described. The non-transitory computer-readable medium is configured to store instructions, that when executed by one or more processors, cause a computing system to perform one or more of the functions of the above method.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
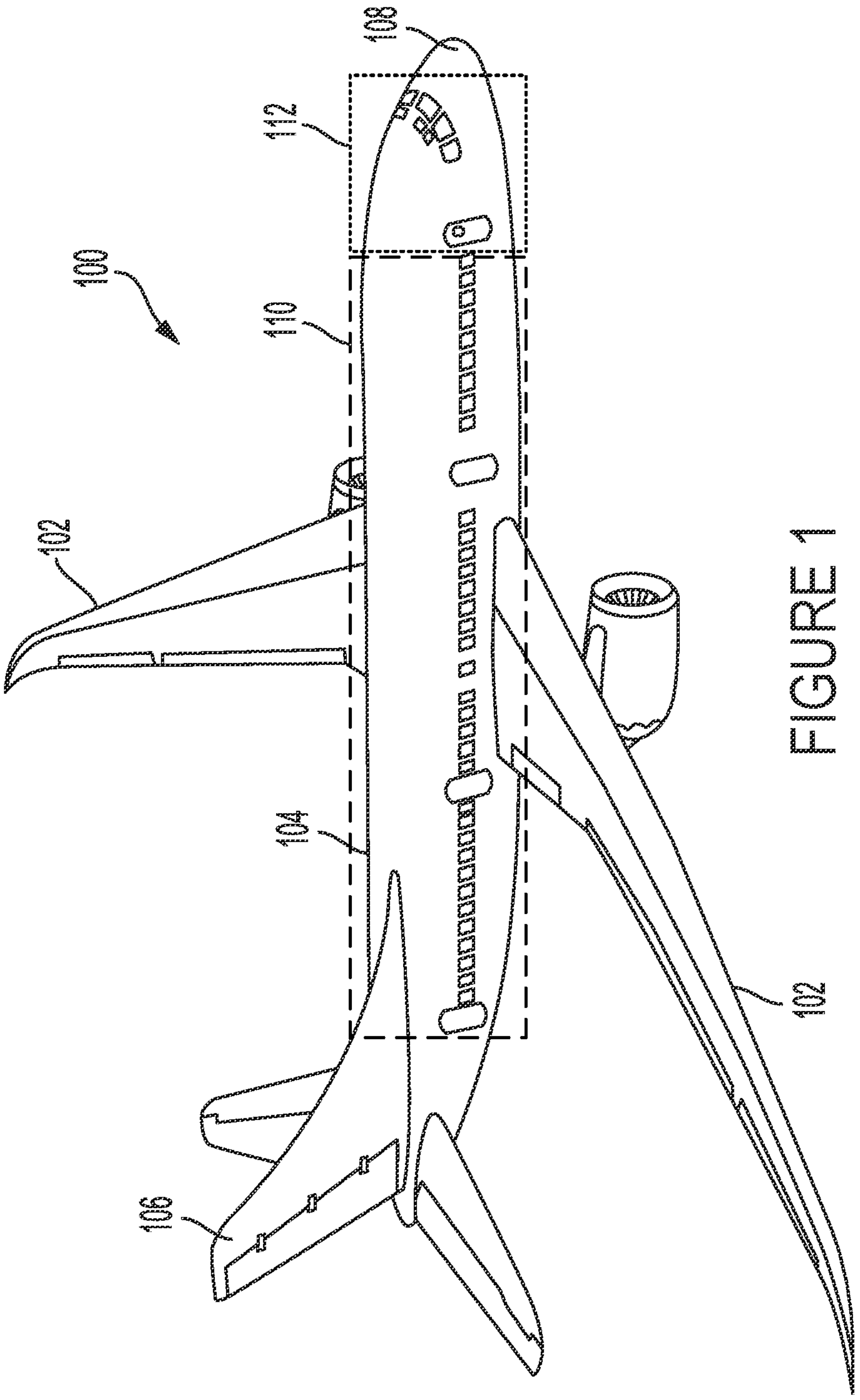
FIG. 1 illustrates a perspective view of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Conventional air traffic management at an airport typically involves aircraft receiving taxi and runway instructions from the ATC, which monitors air traffic, weather conditions, runway use, ground vehicles, flight schedules, and other factors to guide the use, selection, and movement of aircraft and vehicles on the taxiways and runways. For instance, the pilot of an aircraft preparing for takeoff traditionally can receive verbal instructions from a controller located in the ATCT that identifies the runway that the aircraft should use for takeoff. The pilot enters the runway ID of the takeoff runway into the onboard flight management system, which then guides the pilot to the runway for takeoff. A similar process occurs for an aircraft preparing to land, where the ATCT verbally instructs the pilot about the landing runway to use, thereby enabling the pilot to enter the landing runway ID into the onboard flight management system for use during the approach and landing. The ATCT also oversees and guides aircraft and ground vehicles when crossing runways.

As shown, these conventional processes that are typically used at airports require air traffic controllers and pilots to coordinate the selection and timing of a runway for use by the aircraft. In some instances, the interactions and actions required by pilots and controllers can result in human-caused error, such as an aircraft or ground vehicle traveling on the wrong surface or in the wrong direction.

Example embodiments presented herein relate to techniques and systems that incorporate advancements in sensors, computing, and wireless communications to automate and supplement aspects of the conventional process in a manner that can help prevent wrong surface events and other undesired outcomes, and minimize runway incursions by aircraft and ground vehicles at airports. By way of an example, an integrated wrong surface event prevention system establishes aircraft and/or other vehicles with active runways, taxiways, (or other ground surfaces) in temporary, exclusive pairings by using digital and automated technologies in order to prevent wrong way surface events and minimize runway incursions. In particular, a wrong surface event for an airplane on a wrong runway can result in the runway incursion for another airplane or a wrong surface event if no other airplane is using or waiting to use the runway. For instance, if an airplane mistakenly uses a taxiway as a runway for takeoff or landing, this qualifies as a wrong surface event. For a ground vehicle crossing or driving on a runway without a permission, it is considered as a runway incursion event.

The prevention system involves using a runway-aircraft pairing management system that can supplement the communications that typically occurs between aircraft or ground vehicles, and controllers at the ATCT. In addition, the runway-aircraft pairing management system also uses sensor subsystems positioned nearby runways and/or other areas of the airport to transmit runway ID codes to aircraft (or ground vehicle) based on runway assignments generated by the ATCT at the airport. Thus, in addition to ground instructions identifying a runway and other information provided directly to an aircraft by the ATCT, the aircraft and the ATCT also communicate with the runway-aircraft pairing management system, which further coordinates and monitors pairings between aircraft (or ground vehicles) and runways and other ground surfaces. As such, the prevention system can use the runway-aircraft pairing management system to coordinate and monitor aircraft-runway pairings in accordance to the ATCT instructions for aircraft during various actions, such as during take-off procedures, approach and landing procedures, or when crossing over a runway.

The prevention system can monitor activities at the airport and ensures that there is a one-to-one (1:1) exclusive pairing between an aircraft (or a ground vehicle) and a ground surface (e.g., a runway) as specified by the ATCT and prohibits other pairings involving the ground surface until the ground surface is available again. The prevention system can use sensor subsystems, data from aircraft, and/or other information to determine when an aircraft has completed use of a runway, which enables the runway to be subsequently paired with another aircraft or ground vehicle.

In some cases, the prevention system may detect that a potential pairing between an aircraft and a runway (or another type of ground surface) has failed. For instance, an onboard verification system on an aircraft may determine that the runway ID code received from the runway-aircraft pairing management system does not match with the runway specified in instructions received from the ATCT. The aircraft can transmit an unsuccessful message (and other information, such as the source of the difference) to the runway-aircraft pairing management system and/or the ATCT. In addition, the aircraft can also trigger one or more automated actions to avoid a wrong surface event. For instance, the automated actions can prevent the aircraft from taking-off, activate a missed approach procedure, or stop the aircraft from crossing over a runway. The aircraft can also provide an audiovisual alert specifying instructions for the pilot(s) to avoid use (or delay use) of the runway. Further, examples presented herein can be used for various types of aircraft, including advanced air mobility and uncrewed aerial vehicles.

Referring now to the Figures, FIG. 1 illustrates a perspective view of an aircraft, according to an example implementation. The aircraft 100 is shown implemented with a set of wings 102, a fuselage 104, a tail 106, and a nose 108. In other embodiments, the aircraft 100 can have other configurations. In addition, FIG. 1 shows a position of a cabin 110 and a flight deck 112 of the aircraft 100. The cabin 110 and the flight deck 112, together collectively, make up the occupancy areas of the aircraft 100 where passengers and crew may occupy during flight. In particular, passengers may sit within the cabin 110 while pilots operate the aircraft from within the flight deck 112. Other types of aircraft can be used within examples.

The aircraft 100 may include various subsystems or components that work together to ensure safe and efficient flight. For instance, the aircraft 100 includes an electrical system, which provides electrical power to the aircraft and can include generators, batteries, wiring, and various other electrical components. The aircraft 100 also includes a hydraulic system to power various components, such as landing gear, flaps, and brakes, and a fuel system to store and distribute fuel to the engines. The aircraft 100 further includes a navigation system that enables navigation and communication with air traffic control, a communication system to enable communication with other aircraft and the ground, and a flight control system to control the movement of the aircraft 100. In addition, the aircraft 100 also includes an environment control system to maintain a comfortable environment for passengers and crew by regulating temperature, humidity, and air quality. The aircraft also includes a landing gear system, an avionics system, and other systems.

The aircraft 100 can also include additional subsystems that can perform operations disclosed herein. The subsystems can be part of the navigation system or another system of the aircraft 100 described above. As such, the subsystems can include one or more onboard transmitters, onboard receivers, and a verification system. The aircraft 100 can use an onboard receiver to receive information from external sources, such as the runway ID code transmitted by a sensor subsystem positioned proximate a runway and used by a runway-aircraft pairing system. Similarly, the aircraft 100 can use the transmitter to provide data to other sources, such as transmitting messages to the sensor subsystem used by the runway-aircraft pairing system. For instance, the aircraft 100 can use the onboard transmitter to transmit data to the runway-aircraft pairing system and/or the ATCT indicating when a pairing is successful or unsuccessful. The verification subsystem can be used to verify aircraft-runway pairings by comparing instructions received from the ATCT with a runway ID code provided by the runway-aircraft pairing system.

Figure 2:
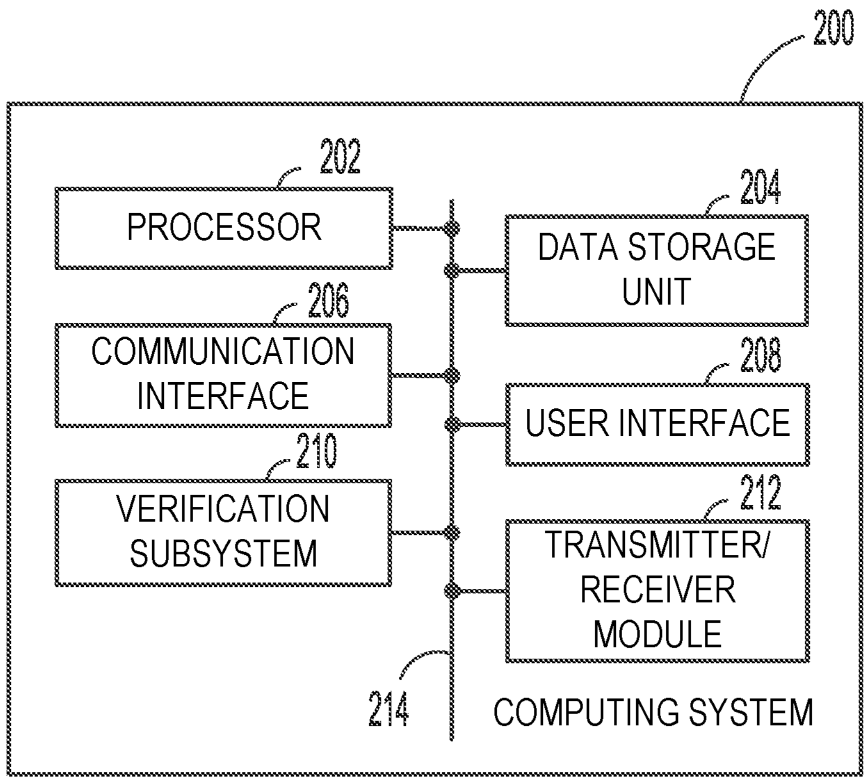
FIG. 2 is a block diagram of a computing system, according to an example implementation.

FIG. 2 is a block diagram of a computing system, according to an example implementation. The computing system 200 may perform various acts and/or functions, such as those described in this disclosure. For instance, the computing system 200 may evaluate the health of various components or systems on the aircraft 100 shown in FIG. 1. The computing system 200 may include various components, such as a processor 202, a data storage unit 204, a communication interface 206, a user interface 208, a verification subsystem 210, and a transmitter/receiver module 212. The components can be connected to each other (or to another device, system, or other entity) via a connection mechanism 214, and can include more or fewer components in other example implementations. In other embodiments, the computing system 200 may be implemented across multiple computing devices operating within a network.

In addition, the computing system 200 can be located onboard an aircraft (e.g., the aircraft 100 shown in FIG. 1) or remotely from the aircraft or a combination of onboard and remote computing systems. For instance, the computing system 200 can perform disclosed operations onboard an aircraft. Similarly, the ATCT can have one or more computing systems and the runway-aircraft pairing system can also include one or more computing systems, which coordinate with the computing system 200 located onboard the aircraft.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The processor 202 may represent one or more general-purpose processors (e.g., a microprocessor) and/or one or more special-purpose processors (e.g., a digital signal processor (DSP)). As such, the processor 202 may include a combination of processors. The processor 202 may perform operations, including the processing of data received from the other components within the computing system 200 and of data obtained from external sources, such as sensors (e.g., aircraft sensors) and/or simulation engines.

The data storage unit 204 may include one or more volatile, non-volatile, removable, and/or non-removable storage components, such as magnetic, optical, or flash storage, and/or can be integrated in whole or in part with the processor 202. As such, the data storage unit 204 may take the form of a non-transitory computer readable medium, having stored therein instructions executable (e.g., compiled or non-compiled program logic and/or machine code) that, when executed by the processor 202, cause the computing system 200 to perform one or more acts and/or functions, such as those described in this disclosure. Such program instructions can define and/or be part of a discrete software application. In some instances, the computing system 200 can execute program instructions in response to receiving an input, such as from the communication interface 206 or the user interface 208. The data storage unit 204 may also store other types of data, such as those types described in this disclosure.

In some examples, the data storage unit 204 may serve as a local storage for information obtained from one or more external sources. For example, the data storage unit 204 may store information obtained from sensors. The data storage unit 204 can also store instructions executable by the processor 202 to perform functions of the computing system 200. For example, any of the modules or subsystems described herein may take the form of instructions executable by the processor 202 and the instructions can be stored on the data storage unit 204.

The communication interface 206 can allow the computing system 200 to connect to and/or to communicate with another entity (e.g., another computing device) according to one or more protocols. In an example, the communication interface 206 can be a wired interface, such as an Ethernet interface or a high-definition serial-digital-interface (HD-SDI). In another example, the communication interface 206 can be a wireless interface, such as a cellular or other interface. A connection can be a direct connection or an indirect connection, the latter being a connection that passes through and/or traverses one or more entities, such as a router, switcher, or other network device. Likewise, a transmission can be a direct transmission or an indirect transmission. The communication interface 206 may also utilize other types of wireless communication to enable communicating with one or more aircraft and remote computing systems that can perform processing operations described herein.

The user interface 208 can enable one or more users (e.g., a pilot, an air traffic controller) to interact with the computing system 200, including to enable input and analysis related to disclosed operations. For instance, the user interface 208 can provide alerts and/or other information based on aircraft-runway pairings as disclosed herein. The alerts can include audio, visual, tactile, and/or other types of alerts. In some instances, the alerts can include text, audio-based text, and/or other visualizations. As such, the user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 208 can include hardware and/or software components that facilitate interaction between the computing system 200 and one or more users.

The verification subsystem 210 can be used to verify runway assignment and pairings. In particular, the verification subsystem 210 can compare instructions received from the ATCT and compare the assigned runway to the runway specified by a runway ID code received from a sensor subsystem located at the airport and connected to the runway-aircraft pairing system. In general, the verification subsystem 210 can verify the correctness, integrity, authenticity, or compliance of data, information, or operations in order to ensure that the system or the data being processed meets certain predefined criteria or standards. The verification subsystem 210 can use various techniques, algorithms, and protocols to validate and authenticate data or operations. In some instances, the verification subsystem 210 may check data formats, perform calculations or comparisons, validate user inputs, verify digital signatures, and/or conduct checks against predefined rules or specifications.

Figure 3:
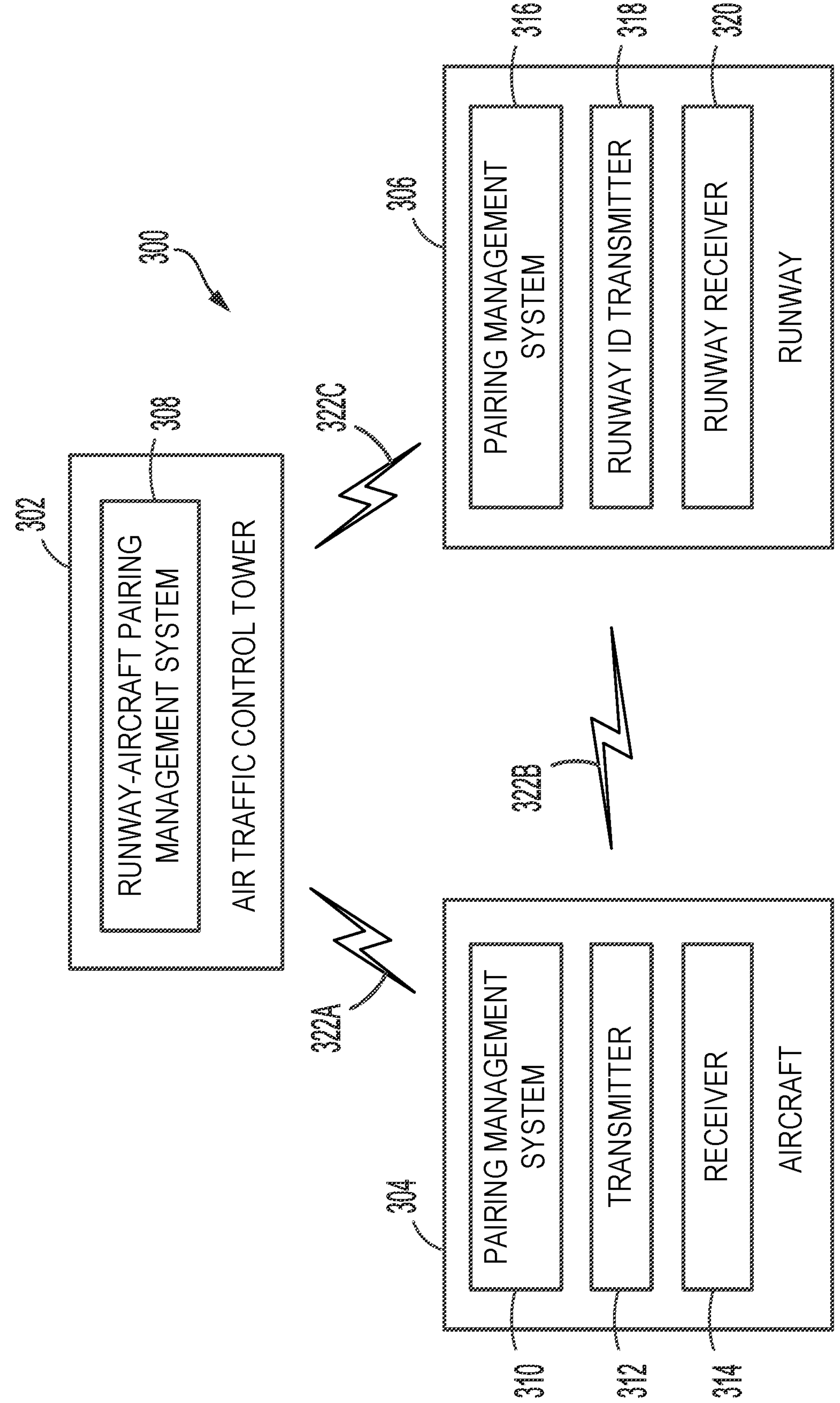
FIG. 3 is a system for coordinating and assigning aircraft and ground vehicles to runways and taxi surfaces to prevent wrong surface events and to minimize runway incursions, according to an example implementation.

The transmitter/receiver module 212 can include one or more transmitters to transmit data and one/or more receivers to receive data, such as runway ID codes. In some cases, the transmitter/receiver module 212 serves as a transceiver module that combines the functionalities of both a transmitter and a receiver in a single module. The transmitter component of the module is responsible for converting electrical signals or data into a suitable format for transmission over a communication medium, such as wires, optical fibers, or wireless channels. It typically includes components such as a signal generator, modulation circuitry, and an amplifier. The transmitter processes the input signals and generates a modulated output signal that carries the information to be transmitted. The receiver component of the transmitter/receiver module 212 is responsible for receiving the transmitted signal, extracting the information from it, and converting it back into its original form for further processing. The receiver typically includes components such as a demodulator, filtering circuitry, amplifiers, and signal processing circuits and can perform signal amplification, noise filtering, demodulation, and decoding to extract the transmitted information FIG. 3 illustrate a system 300 for coordinating and assigning aircraft and ground vehicles to runways to prevent wrong surface events and to minimize runway incursions. In the example, system 300 includes an air traffic control tower (ATCT) 302, aircraft 304, and a runway 306 and represents an example prevention system that can coordinate aircraft and ground vehicle use of runways at an airport. In other examples, the system 300 can include additional or fewer components. For instance, the system 300 can include additional aircraft, ATCTs, runways, taxiways, and/or ground vehicles within other examples.

The ATCT 302 represents one or more tall structures located at an airport that serve as the central command for air traffic control operations. As shown in FIG. 3, the ATCT 302 includes a runway-aircraft pairing management system 308, which can be used to perform aircraft-runway pairing operations described herein.

In general, the ATCT 302 can be staffed by air traffic controllers, who are responsible for ensuring the safe and efficient movement of aircraft within the airport's airspace. As such, the ATCT 302 is responsible for maintaining separation between aircraft, and between aircraft and other objects (e.g., ground vehicles) at the airport. Controllers can monitor radar displays and use visual observations to ensure that aircraft maintain safe distances from each other during all phases of flight, including takeoff, landing, and taxiing. In addition, the ATCT 302 enables controllers to issue clearances and instructions to pilots, which includes authorizing departures and arrivals, providing instructions for taxiing on the ground, and giving clearance for takeoff or landing. Controllers communicate with pilots via radio frequencies and relay important information to ensure safe and orderly operations.

The controllers at the ATCT 302 manage the usage of runways to optimize efficiency and safety. Controllers coordinate arrivals and departures, sequence aircraft for landing or takeoff, and determine which runways are in use based on factors such as wind direction, weather conditions, and runway availability. They also monitor the condition of runways and report any issues to maintenance personnel if necessary. In some cases, controllers at the ATCT 302 collaborates with other ATC facilities, such as approach control and en-route centers, to manage the flow of air traffic in and out of the airport. They coordinate departure and arrival schedules, manage airspace congestion, and ensure smooth transitions of aircraft between different control sectors. In the event of emergencies, such as aircraft malfunctions or weather-related incidents, air traffic controllers at ATCT 302 play a crucial role in coordinating emergency response procedures. They provide guidance to pilots, issue diversion instructions, and ensure that emergency services are promptly alerted and deployed as needed.

In general, air traffic controllers situated at the ATCT 302 maintain constant communication with pilots, ground personnel, and other ATC facilities to exchange important information regarding the movement of aircraft. They use standardized phraseology and procedures to ensure clear and effective communication, facilitating the safe and efficient flow of air traffic. Using radar displays and other surveillance systems, controllers at the ATCT 302 can monitor the position, altitude, and speed of aircraft within their airspace. They track aircraft movements, identify potential conflicts or deviations from planned routes, and take necessary actions to resolve any issues that may arise. In addition, the ATCT 302 enables controllers to monitor weather conditions, including visibility, wind speed, and precipitation. They relay this information to pilots, providing updates and advisories that may impact aircraft operations. Controllers work closely with meteorological services to ensure accurate and timely weather information is available. The ATCT 302 serves as a vital link in the air transportation system, ensuring the safe and orderly flow of aircraft within the airport's airspace. The actions performed by air traffic controllers are to prevent collisions, minimize delays, and maintain the overall safety and efficiency of air traffic operations.

Aircraft 304 represents an aircraft that can perform operations disclosed herein, such as obtaining and using an assigned runway to perform a landing procedure, a take-off procedure, or crossing over a runway. The aircraft 304 can include a computing system (e.g., the computing system 200 shown in FIG. 2) to perform disclosed operations. As shown in FIG. 3, the aircraft 304 includes pairing management system 310, transmitter 312, and receiver 314. The pairing management system 310 can work with the runway-aircraft pairing management system 308 of the ATCT 302 and the pairing management system 316 of the runway 306 to complete a pairing of the aircraft 304 with the runway 306. The transmitter 312 can be used by the pairing management system 310 to transmit messages and other data to the runway receiver 320 and/or the ATCT 302. The receiver 314 can be used by the paring management system 310 to receive runway code instructions and other information from the ATCT 302 and the runway ID transmitter 318 located at the runway 306.

Runway 306 represents one or more designated strips of land at an airport, typically paved or hardened, that is used for the takeoff and landing of aircraft (e.g., aircraft 304). As shown in FIG. 3, the runway 306 includes a pairing management system 316, a runway ID transmitter 318, and a runway receiver 320.

In practice, the runway 306 provides a controlled surface for aircraft operations and facilitates the movement of planes on the ground. Runway 306 is equipped with various visual aids to assist pilots during takeoff, landing, and taxiing. These include painted markings such as centerlines, threshold markings, runway numbers, and touchdown zones markings. Additionally, runway lighting systems are used to provide guidance to pilots during low visibility conditions, including edge lights, threshold lights, and runway centerline lights. In some instances, the runway 306 represents taxiways or other ground surfaces at the airport.

The pairing management system 316 enables pairing aircraft (e.g., aircraft 304) to the runway 306 for a limited, exclusive pairing that helps prevent a wrong surface event. The runway ID transmitter 318 can be used by the pairing management system 316 to transmit a runway ID code to the aircraft 304, which can verify the runway 306 matches the runway assigned by the runway-aircraft pairing management system 308 at the ATCT 302. The runway receiver 320 can be used by the pairing management system 316 to receive messages and other information from the aircraft 304 and/or other sources (e.g., from the ATCT 302).

In addition, the ATCT 302, the aircraft 304, and the runway 306 are shown engaging in wireless communication in FIG. 3. In particular, the aircraft 304 and subsystems on the aircraft 304 are shown communicating with the ATCT 302 via wireless communication 322A and communicating with the runway (and corresponding subsystems) via wireless communication 322B. The ATCT 302 is shown communicating with the runway 306 via wireless communication 322C. The wireless communication used between entities can include various types of communication technologies, including encryption technology.

Figure 4:
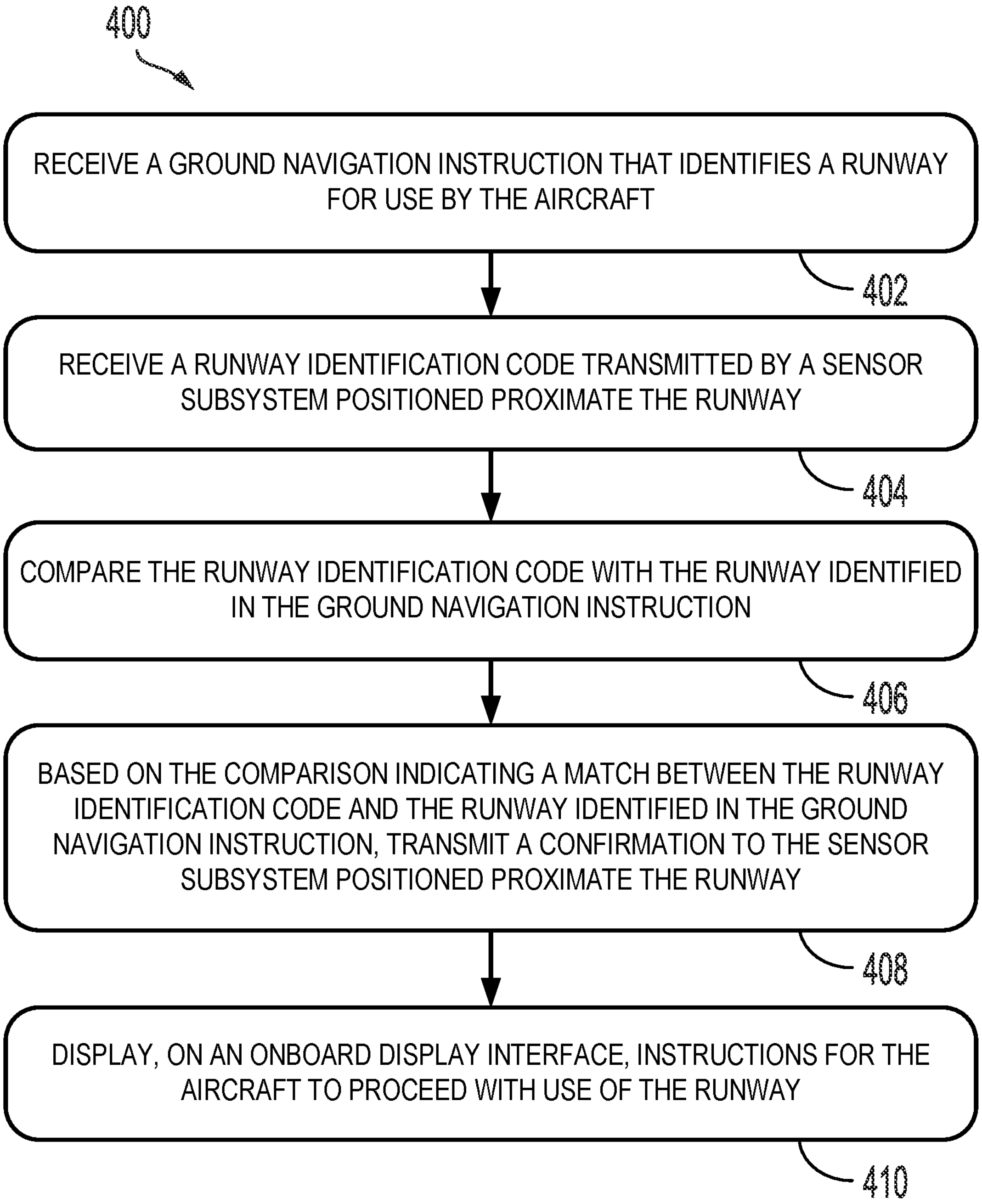
FIG. 4 is a flowchart of a method for coordinating and assigning aircraft to a runway to prevent wrong surface events and to minimize runway incursions, according to an example implementation.

FIG. 4 shows a flowchart of a method, according to an example implementation. Method 400 presents an example method that could be used with the aircraft 100 shown in FIG. 1, the computing system 200 shown in FIG. 2, the system 300 shown in FIG. 3 and/or other devices and systems disclosed herein. In other examples, components of the devices and/or systems may be arranged to be adapted to, capable of, or suited for performing the functions, when operated in a specific manner.

Method 400 can include one or more operations, functions, or actions as illustrated by one or more of blocks 402, 404, 406, 408, and 410. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 402, method 400 involves receiving, at a computing system coupled to an aircraft, a ground navigation instruction that identifies a runway for use by the aircraft. The ground navigation instruction is generated by an ATCT. For instance, the ground navigation instruction can be determined by the ATCT based on a runway status of the runway provided by the runway-aircraft pairing management system, flight and ground traffic conditions, and air traffic and airspace conditions. As such, receiving the ground navigation instruction can involve receiving the ground navigation instruction via spoken instructions from the ATCT and/or receiving the ground navigation instruction via a digital link.

At block 404, method 400 involves receiving a runway ID code transmitted by a sensor subsystem positioned proximate the runway. In particular, a runway-aircraft pairing management system generates the runway ID code for transmission by the sensor subsystem based on the ground navigation instruction generated by the ATCT.

Receiving the runway ID code can involve receiving a signal pulse pattern, digital information, and/or digital numeric code transmitted by the sensor subsystem. As an example, the runway ID code can be represented as 15-TO or 15L-0100. In the example, either runway ID code, 15-TO or 15L-0100, identifies a runway for the use of takeoff by an airplane. In particular, "15" represents runway 15, "15L" represents runway 15L, "TO" and "0100" represent for "takeoff" use in a letter format and in a numeric format, respectively. Other types of runway ID codes can be used within examples. In addition, the runway-aircraft pairing management system is further configured to also monitor ground vehicles relative to the runway. In some cases, the aircraft can receive the runway ID code prior to initiating a take-off procedure, a final approach and landing procedure, or a runway crossing-over procedure.

At block 406, method 400 involves comparing, by the computing system and using an onboard verification system, the runway ID code with the runway identified in the ground navigation instruction. The comparison can be performed based on receiving the runway ID code.

At block 408, method 400 involves transmitting, by the computing system and using an onboard transmitter, a confirmation to the sensor subsystem positioned proximate the runway based on the comparison indicating a match between the runway ID code and the runway identified in the ground navigation instruction.

The runway-aircraft pairing management system updates a runway status for the runway based on receiving the confirmation from the onboard transmitter and can provide the updated runway status to the ATCT and the aircraft. As such, the runway-aircraft pairing management system can subsequently modify the runway status for the runway to available based on detecting the aircraft navigate beyond a predefined threshold on the runway. In addition, the runway-aircraft pairing management system is further configured to monitor ground vehicles relative to the runway.

At block 410, method 400 involves displaying, by the computing system and on an onboard display interface, instructions for the aircraft to proceed with use of the runway. In some cases, the computing system may receive an override message that cancels the ground navigation instruction. As such, the computing system may perform an automatic action that prevents the aircraft from using the runway based on receiving the override message.

In some cases, method 400 further involves transmitting, by the computing system and using the onboard transmitter, an unsuccessful message to the sensor subsystem positioned proximate the runway based on the comparison indicating a difference between the runway ID code and the runway identified in the ground navigation instruction. Method 400 further involves triggering an automatic action by the aircraft in response. For instance, triggering the automatic action by the aircraft can involve inhibiting takeoff thrust at the aircraft and/or providing an audiovisual alert specifying instructions to avoid use of the runway. The alert can be provided on the onboard display interface.

Figure 5:
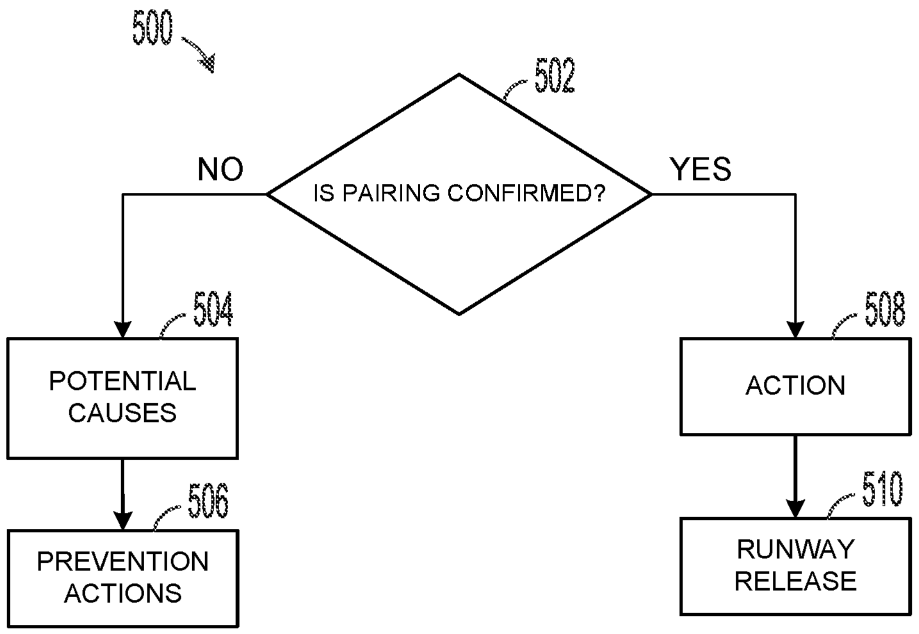
FIG. 5 is another flowchart of a method for preventing wrong surface events and minimizing runway incursions, according to an example implementation.

FIG. 5 shows a flowchart of a method, according to an example implementation. Method 500 presents an example method that could be used with the aircraft 100 shown in FIG. 1, the computing system 200 shown in FIG. 2, the system 300 shown in FIG. 3 and/or other devices and systems disclosed herein. In other examples, components of the devices and/or systems may be arranged to be adapted to, capable of, or suited for performing the functions, when operated in a specific manner.

At block 502, method 500 involves determining whether a pairing is confirmed. In particular, method 500 can involve the aircraft, the ATCT, and/or a runway-aircraft pairing system located by a runway to analyze a potential pairing between the aircraft and the runway. When the pairing is not confirmed at block 502, method 500 then involves identifying potential causes that prevented the pairing at block 504. Some potential causes that may have prevented the pairing include a potential wrong surface event, the assigned runway is currently occupied, and/or a human-caused error. Method 500 then proceeds to prevention actions at block 506, which can include actions performed automatically (or semi-automatically) by the aircraft to prevent potential wrong way events. For instance, prevention actions at block 506 can include an onboard warning to pilots and aircraft takeoff thrust level being prohibited. Preventive actions can also include issuing a warning to the ATCT and/or instructing the pilots to contact the ATCT for further directions.

When the pairing is confirmed at block 502, method 500 proceeds to block 508, which involves performing an action, such as the aircraft preparing to takeoff, to land, or to crossover the runway. At block 510, the runway is released and becomes available for another pairing with a different aircraft or ground vehicle. For instance, the runway can be released once the aircraft reaches a predefined state, such as passing a pre-defined location (e.g., runway threshold or a taxiway exit), reaching a pre-defined height above the runway, reaching or a pre-defined time after takeoff roll. In other cases, the runway can be released for other pairing once the aircraft or a ground vehicle intended to cross the runway reaches a predefined state, such as completing the crossing of a runway and being outside the runway safety area.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising transmitting a signal that includes a limited, exclusive pairing of an aircraft with a runway of an airport assigned for use by the aircraft, wherein the limited, exclusive pairing includes a runway identification (ID) code which verifies that the runway matches the runway assigned for use by the aircraft receiving, by one or more processors of the aircraft on a ground of a taxiway at the airport, a ground navigation instruction that identifies the runway for use by the aircraft on the ground, wherein the ground navigation instruction is generated by an Air Traffic Control Tower (ATCT);

receiving, by the one or more processors, the runway ID code transmitted by a sensor subsystem, wherein the runway ID code further is based on the ground navigation instruction generated by the ATCT;

based on receiving the runway ID code, comparing, by the one or more processors, the runway ID code with the runway identified in the ground navigation instruction;

based on the comparison indicating a match between the runway ID code and the runway identified in the ground navigation instruction, transmitting, by the one or more processors, a confirmation to the sensor subsystem;

displaying, by the one or more processors on an onboard display interface, instructions for the aircraft to proceed with use of the runway;

receiving, by the one or more processors, an override message that cancels the ground navigation instruction; and based on receiving the override message, automatically preventing the aircraft on the ground of the taxiway of the airport from using the runway of the airport.

2. The method of claim 1, further comprising:

based on the comparison indicating a difference between the runway ID code and the runway identified in the ground navigation instruction, transmitting, by the one or more processors, an unsuccessful message to the sensor subsystem; and triggering an automatic action by the aircraft.

3. The method of claim 2, wherein triggering the automatic action by the aircraft comprises inhibiting takeoff thrust at the aircraft, or activating brakes by the aircraft.

4. The method of claim 2, wherein triggering the automatic action by the aircraft comprises:

providing, on the onboard display interface, an audiovisual alert specifying instructions to avoid use of the runway.

5. The method of claim 1, wherein a runway-aircraft pairing management system updates a runway status for the runway based on receiving the confirmation from the onboard transmitter, and wherein the runway-aircraft pairing management system provides the updated runway status to the ATCT and the aircraft.

6. The method of claim 5, wherein the runway-aircraft pairing management system modifies the runway status for the runway to available based on detecting the aircraft navigate beyond a predefined threshold on the runway.

7. The method of claim 1, wherein the ground navigation instruction is determined by the ATCT based on a runway status of the runway provided by a runway-aircraft pairing management system, flight and ground traffic conditions, and air traffic and airspace conditions.

8. The method of claim 1, wherein receiving the ground navigation instruction identifying the runway for use by the aircraft comprises receiving the ground navigation instruction via spoken instructions from the ATCT.

9. The method of claim 1, wherein receiving the ground navigation instruction identifying the runway for use by the aircraft comprises receiving the ground navigation instruction via a digital link.

10. The method of claim 1, wherein receiving the runway ID code transmitted by the sensor subsystem comprises receiving a signal pulse pattern or digital information transmitted by the sensor subsystem.

11. The method of claim 1, further comprising monitoring ground vehicles relative to the runway.

12. The method of claim 1, wherein the runway ID code comprises:

the runway for use in a numeric format; and an indication that the runway is for takeoff or landing in letter and numeric format.

13. A system comprising:

a runway-aircraft pairing management system; and an aircraft on a ground of a taxiway at an airport, the aircraft having one or more processors configured to:

receive a signal that includes a limited, exclusive pairing of the aircraft with a runway of the airport assigned for use by the aircraft, wherein the limited, exclusive pairing includes a runway identification (ID) code which verifies that the runway matches the runway assigned for use by the aircraft;

receive a ground navigation instruction that identifies the runway of the airport for use by the aircraft, wherein the ground navigation instruction is generated by an Air Traffic Control Tower (ATCT);

receive the runway ID code transmitted by a sensor subsystem, wherein the runway-aircraft pairing management system generates the runway ID code for transmission by the sensor subsystem based on the ground navigation instruction generated by the ATCT;

based on receiving the runway ID code, compare, using an onboard verification system, the runway ID code with the runway identified in the ground navigation instruction;

based on the comparison indicating a match between the runway ID code and the runway identified in the ground navigation instruction, transmit, using an onboard transmitter, a confirmation to the sensor subsystem;

display, on an onboard display interface, instructions for the aircraft to proceed with use of the runway;

receive an override message that cancels the ground navigation instruction; and based on the override message, automatically prevent the aircraft on the ground of the taxiway of the airport from using the runway of the airport.

14. The system of claim 13, wherein the one or more processors are further configured to:

based on the comparison indicating a difference between the runway ID code and the runway identified in the ground navigation instruction, transmit an unsuccessful message to the sensor subsystem; and trigger an automatic action by the aircraft.

15. The system of claim 14, wherein the automatic action comprises:

inhibiting takeoff thrust at the aircraft, and activating brakes by the aircraft; and providing, on the onboard display interface, an audiovisual alert specifying instructions to avoid use of the runway.

16. The system of claim 13, wherein the ground navigation instruction is determined by the ATCT based on a runway status of the runway provided by the runway-aircraft pairing management system, flight and ground traffic conditions, and air traffic and airspace conditions.

17. The system of claim 13, wherein the runway-aircraft pairing management system updates a runway status for the runway based on receiving the confirmation from the onboard transmitter, and wherein the runway-aircraft pairing management system provides the updated runway status to the ATCT and the aircraft.

18. The system of claim 13, wherein the one or more processors are further configured to cause the aircraft to autonomously navigate the runway.

19. The system of claim 13, wherein the one or more processors are further configured to receive the runway ID code prior to initiating a take-off procedure, a final approach and landing procedure, or a runway crossing-over procedure.

20. A non-transitory computer readable medium configured to store instructions, that when executed by a computing system, causes the computing system to perform operations comprising:

transmitting a signal that includes a limited, exclusive pairing of an aircraft with a runway of an airport assigned for use by the aircraft, wherein the limiting, exclusive pairing includes a runway identification (ID) code which verifies that the runway matches the runway assigned for use by the aircraft;

receiving a ground navigation instruction that identifies the runway of the airport for use by the aircraft on a ground of a taxiway at the airport, wherein the ground navigation instruction is generated by an Air Traffic Control Tower (ATCT);

receiving the runway ID code transmitted by a sensor subsystem positioned, wherein a runway-aircraft pairing management system generates the runway ID code for transmission by the sensor subsystem based on the ground navigation instruction generated by the ATCT;

based on receiving the runway ID code, comparing, using an onboard verification system, the runway ID code with the runway identified in the ground navigation instruction;

based on the comparison indicating a match between the runway ID code and the runway identified in the ground navigation instruction, transmitting, using an onboard transmitter, a confirmation to the sensor subsystem;

displaying, on an onboard display interface, instructions for the aircraft to proceed with use of the runway;

receiving an override message that cancels the ground navigation instruction; and based on receiving the override message, automatically preventing the aircraft on the ground of the taxiway of the airport from using the runway of the airport.

* * * * *